(12) United States Patent
Miller et al.

(10) Patent No.: US 9,886,488 B2
(45) Date of Patent: *Feb. 6, 2018

(54) CONCEPTUAL DOCUMENT ANALYSIS AND CHARACTERIZATION (71) Applicant: Altep, Inc., El Paso, TX (US)

(72) Inventors: Roger W. Miller, El Paso, TX (US); Willem R. van den Berge, Las Cruces, NM (US)

(73) Assignee: ALTEP, INC., El Paso, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/215,470

(22) Filed: Jul. 20, 2016

(65) Prior Publication Data
US 2016/0328454 A1 Nov. 10, 2016

Related U.S. Application Data (63) Continuation of application No. 14/697,315, filed on Apr. 27, 2015, now Pat. No. 9,424,321.

(51) Int. Cl.
*G06F 17/30* (2006.01)

(52) U.S. Cl.
CPC .. *G06F 17/30528* (2013.01); *G06F 17/30011* (2013.01); *G06F 17/3053* (2013.01); *G06F 17/3056* (2013.01); *G06F 17/30707* (2013.01)

(58) Field of Classification Search
CPC ....... G06F 17/305289; G06F 17/30011; G06F 17/30516; G06F 17/3053; G06F 17/3056; G06F 17/30598; G06F 17/30864; G06F 17/30997

USPC .......................................................... 707/728
See application file for complete search history.

(56) References Cited

U.S. PATENT DOCUMENTS

| 6,446,061 | B1* | 9/2002 | Doerre ................ G06F 17/3071 |
| | | | 707/738 |
| 8,315,849 | B1 | 11/2012 | Gattani et al. |
| 2002/0035555 | A1* | 3/2002 | Wheeler .......... G06F 17/30289 |
| 2003/0061200 | A1 | 3/2003 | Hubert et al. |
| 2003/0069877 | A1 | 4/2003 | Grefenstette et al. |
| 2003/0120653 | A1* | 6/2003 | Brady ............... G06F 17/30864 |
| 2003/0154212 | A1 | 8/2003 | Schirmer et al. |
| 2005/0050026 | A1 | 3/2005 | Kawamura et al. |
| 2006/0242147 | A1* | 10/2006 | Gehrking .......... G06F 17/30707 |
| 2007/0106662 | A1* | 5/2007 | Kimbrough ....... G06F 17/30707 |

(Continued)

FOREIGN PATENT DOCUMENTS

| JP | H103478 A | 1/1998 |
| WO | WO-2011068315 A2 | 6/2011 |

*Primary Examiner* — Thanh-Ha Dang
(74) *Attorney, Agent, or Firm* — Mintz Levin Cohn Ferris Glovsky and Popeo, P.C.

(57) ABSTRACT

Data files are received from data sources that include textual content. The data files are categorized using a taxonomy of categories, where each category has sample textual content that defines a concept for the category. The categorizing includes comparing the textual content of the data file with the sample textual content for the category. A file score is calculated for each data file to compare the degree of similarity between the defined concept of the category and a determined concept for the data file. Each data file is associated with the category if the file score is equal to or greater than a pre-determined minimum score for the category. A portion of the data file and/or file score is be provided.

20 Claims, 10 Drawing Sheets (56) References Cited

U.S. PATENT DOCUMENTS

| | | |
|---|---|---|
| 2008/0027929 A1 | 1/2008 | Rice et al. |
| 2008/0126319 A1* | 5/2008 | Bukai ............... G06F 17/30705 |
| 2008/0263022 A1 | 10/2008 | Kostorizos et al. |
| 2008/0270380 A1 | 10/2008 | Ohrn et al. |
| 2009/0327243 A1 | 12/2009 | Pradhan et al. |
| 2010/0211551 A1 | 8/2010 | Ryu |
| 2010/0332219 A1 | 12/2010 | Liu et al. |
| 2011/0040766 A1* | 2/2011 | Robinson ............ G06F 17/3053 707/749 |
| 2011/0047161 A1 | 2/2011 | Myaeng et al. |
| 2011/0145250 A1 | 6/2011 | Spaggiari |
| 2011/0264649 A1 | 10/2011 | Hsiao et al. |
| 2011/0282858 A1* | 11/2011 | Karidi ............... G06F 17/30707 707/709 |
| 2012/0166441 A1 | 6/2012 | Karidi et al. |
| 2013/0031133 A1 | 1/2013 | Adzic et al. |
| 2013/0091116 A1 | 4/2013 | Kumar |
| 2013/0198193 A1* | 8/2013 | Chitiveli ........... G06F 17/30707 707/740 |
| 2013/0311475 A1 | 11/2013 | Emanuel |
| 2015/0170218 A1* | 6/2015 | Rao .................... G06Q 30/0269 705/14.66 |
| 2017/0124178 A1* | 5/2017 | DeLand ............ G06F 17/30598 |

\* cited by examiner

CONCEPTUAL DOCUMENT ANALYSIS AND CHARACTERIZATION

This application is a continuation application of U.S. patent application Ser. No. 14/697,315, filed Apr. 27, 2015, entitled "CONCEPTUAL DOCUMENT ANALYSIS AND CHARACTERIZATION," which is hereby incorporated by reference in its entirety.

TECHNICAL FIELD

The subject matter described herein relates to computer systems, methods, and techniques for ingesting and analyzing corpora of electronic documents, and providing conceptual analysis and characterization.

BACKGROUND

In requests for information, discovery proceedings, general research, etc., a large body of information must be examined to find and extract relevant documents. When a non-sorted, and even disparate, collection of documents is examined, the relevant documents can be a very small fraction of the overall body of information. Furthermore, in many cases, the documents needed may not be readily apparent from titles, keywords, or other direct identifying means. When the body of information becomes large enough, it becomes untenable for a human to perform a search and analysis of each individual document due to either time, expense, or both. Furthermore, humans may apply different standards to their searching, resulting in inconsistent results. As a result, automated processes of document examination and retrieval, while are typically limited by the intelligence of the searching algorithm, are being increasingly adopted.

SUMMARY

In one aspect, data files are received from data sources that include textual content. The data files are categorized using a taxonomy of categories, where each category has sample textual content that defines a concept for the category. The categorizing includes comparing the textual content of the data file with the sample textual content for the category. A file score is calculated for each data file to compare the degree of similarity between the defined concept of the category and a determined concept for the data file. Each data file is associated with the category if the file score is equal to or greater than a pre-determined minimum score for the category. A portion of the data file and/or file score is be provided.

In some variations one or more of the following features can optionally be included in any feasible combination.

In one implementation, the taxonomy can be generated by adding categories each representing a concept. Sample textual content can be added to the categories to represent the concept. A minimum score can be added to each category. A text item can be identified from the sample textual content and given a text item score to identify the relevance of the text item to the sample.

In another implementation, the associating can be between the data file and only one category, that category being the category that generates the highest file score equal to or greater than the minimum score. The data file can include a source identifier identifying the data source.

In a further implementation, the textual content can be clustered into at least one cluster being representative of identified concepts.

In yet another implementation, providing the data files can include providing a first representation of the data file along with a second representation of all attachments, metadata, or electronic associations. Also, a portion of the data file and/or the associated file score can be displayed, loaded into memory, transmitted to a remote computing device, or stored into persistent memory. The persistent memory can be a local memory, cloud memory, or email storage.

In another implementation, the data files can be received from an ongoing data stream, for example, an email server.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

Implementations of the current subject matter can provide one or more advantages. For example, with the current subject matter, a taxonomy can be created that describes a particular search topic, which in turn, allows fast and accurate characterizing of documents that are determined to be relevant to or related to one or more categories that comprise the taxonomy. Further, the taxonomy can be built up with sample data to provide accurate sorting of documents when used in conjunction with a concept analytics engine.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a taxonomy and concept analytics engine, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

As used herein, the term "document" and "data file" are synonymous and include structured and unstructured data, for example, text files, email, scanned documents, spreadsheets, tables, charts, etc.

DETAILED DESCRIPTION

The current subject matter is directed to methods, systems, apparatus, articles/computer program products for contextually analyzing documents. Document searches, for example in a legal discovery proceeding, often involve the searching of dozens, hundreds, or even thousands of documents, emails, or other electronic records. This laborious process is further complicated by the fact that what is valuable may not be readily or explicitly apparent. The current subject matter provides a method by which a taxonomy of categories is used as a structure with which to identify and characterize data files according the contents of the data files. The data files can be, for example, documents, emails, other electronic records, etc. The sorting is based on each category in the taxonomy having a particular concept associated with it. A conceptual analytics engine analyzes each data file and determines if it matches the concept of a particular category. If so, the data file is associated with that category. In this way, one need only have a well-defined taxonomy that can be applied to any collection of data files in order to extract the relevant data files.

The concept analytics engine can be used to find documents of interest, but can also be used to indicate that no documents of interest are present in the analyzed data files. This feature can be useful for compliance checks where the presence of certain types of data or documents should not be on a system.

Figure 1:
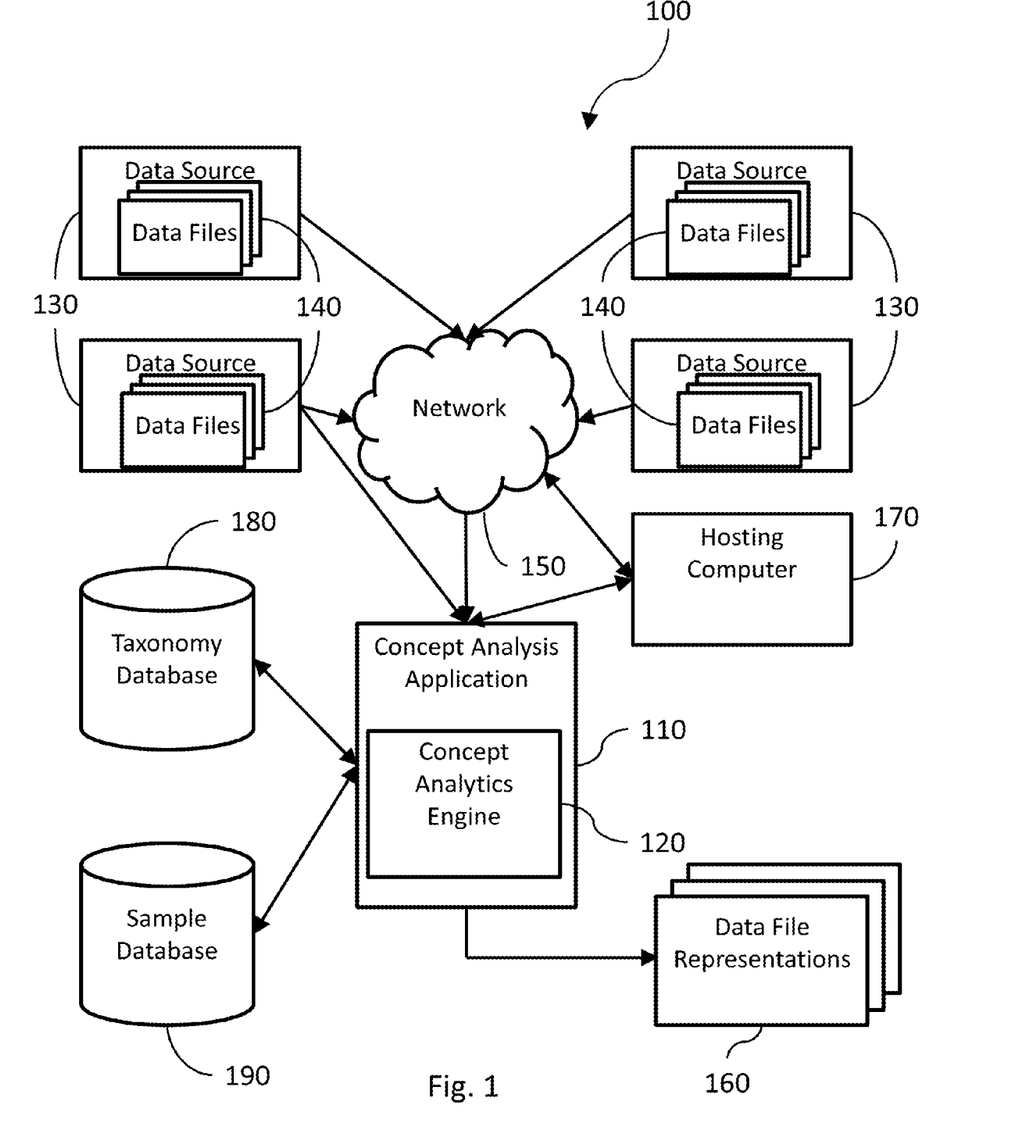
FIG. 1 is a system diagram illustrating a concept analysis application connected to data sources and databases.

FIG. 1 is a system diagram 100 illustrating a concept analysis application 110 connected to data sources and databases. A concept analysis application 110 can be a computer program that executes a concept analytics engine 120 which in turn determines if data sources 130 contain content that match a specified concept or concepts. The concept analysis application 110 accepts and categorizes data files 140 from data sources 130 connected via a network 150. Once the data files 140 are categorized, the data files 140 and an identification of their categorization can be exported as data file representations 160 that provide a representation, or reproduction, of the categorized data files 140.

The concept analysis application 110 can be executed, for example, on a desktop computer, mainframe computer, server, laptop computer, tablet computer, mobile device, etc. The concept analysis application 110 can also be accessed via a graphical user interface (GUI) connected to a hosting computer 170. This can be done, for example, when the computing requirements for executing the concept analysis program cannot be met by a less powerful computer. Information can be passed between the GUI for the concept analysis application 110 and the hosting computer 170. The data sources 130 and/or the hosting computer 170 can be connected to the concept analysis application through the network 150 or via direct link, for example, hardwired, USB port, CD, external hard drives, etc.

The data sources 130 can be a persistent memory repository of data files 140 or other electronic documents that contain text-based content, for example, emails, word processing documents, spreadsheets, text messages, etc. The data files 140 in the data sources 130 can be any file format, for example, zip, rar, ost, dat, rtf, pst, xls, html, pdf, etc. The data sources 130 can be databases, servers, personal computers, laptop computers, or any other device that stores electronic documents. The data sources 130 can be, for example, local persistent memory, USB drives, cloud memory, or e-mail servers.

The data sources 130 can be provided to the concept analysis application 110 via the network 150 or directly accessed on the local memory of the hosting computer 170. The data sources 130 can also be on removable memory sources, for example, flash drives, external hard drives, etc. The data files 140 can be received by the concept analysis application 110 in an intermittent or incremental manner, for example connecting the concept analysis application 110 to the data source 130 only at certain times, or as desired by the user. In this way, the concept analytics application 110 ingests the data files 140 available at that time only. If other data files 140 were later added, the concept analytics 140 can be executed again, and can either re-ingest the entire corpus of the data files 140 or can only ingest the newly added data files 140, i.e. "files added since last execution." In another implementation, the data files 140 can be received by the concept analysis application 110 in an ongoing manner, where, as the data files 140 are generated, created, transmitted, etc. to or from the data sources 140 and/or from a data stream, that the concept analysis application 110 ingests the data files 140 and performs the analysis described herein. The data stream can be, for example, from the e-mail server, cloud servers, local servers, databases, networked computers, etc.

A taxonomy database 180 can be connected to the concept analysis application 110 for the retrieval and saving of taxonomies. Taxonomies are described in greater detail in the discussion of FIG. 2. The sample database 190 can be used to store samples 410 that are used to define concepts for taxonomies. The export database 160 can be used to store data files 140 categorized according to the taxonomy 210 used by the concept analysis application 110. The export database 160 can also be used to store the taxonomy 210 or other identifying data that associates the categorized data files 140 with their corresponding concept. The taxonomy database 180, and the sample database 190, can be, for example, computer hard drives, servers, mainframe computers, optical disc drives, etc.

Figure 2:
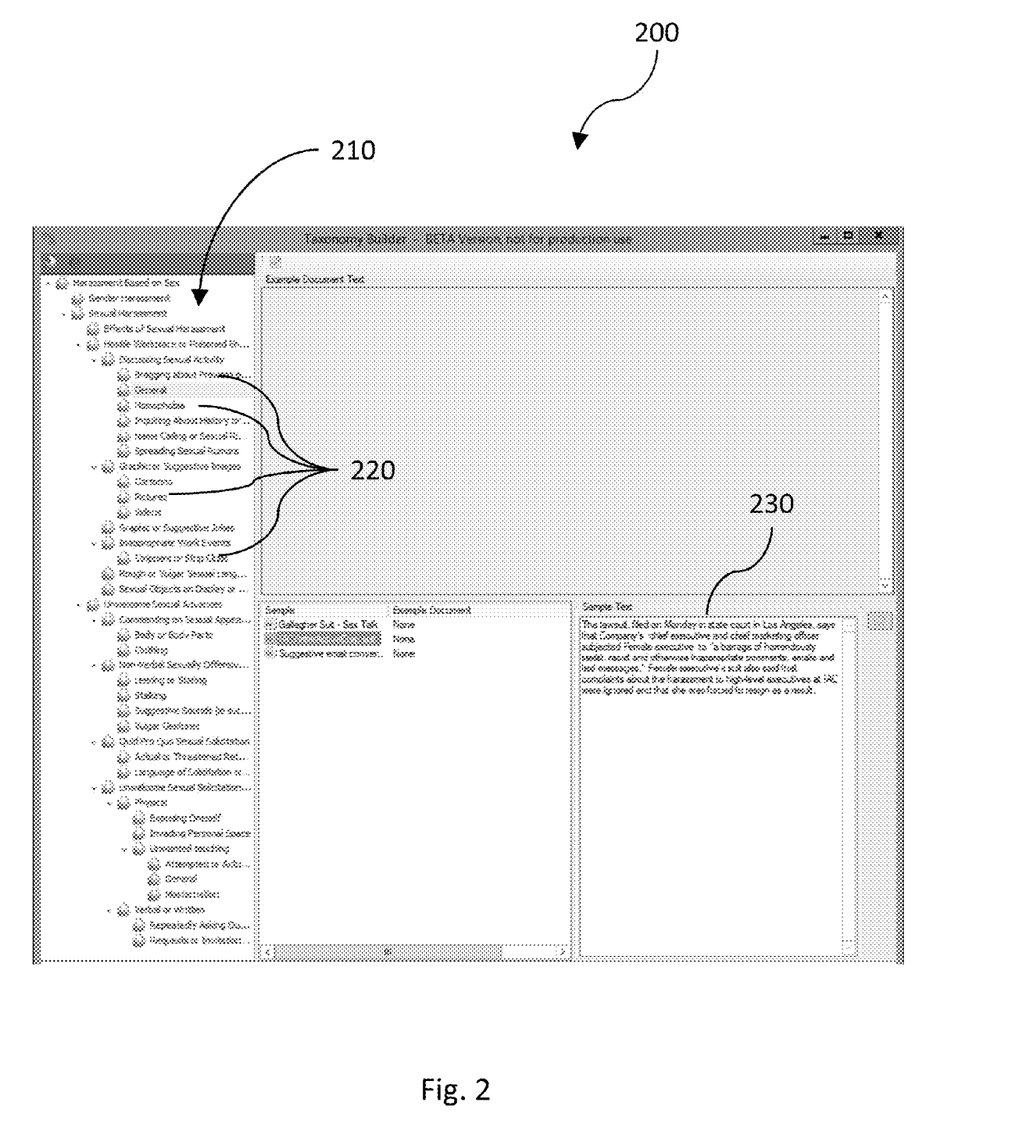
FIG. 2 is a screen capture illustrating a taxonomy.

FIG. 2 is a screen capture 200 illustrating a taxonomy 210. The concept analytics engine 120 can categorize the data files 140 according to the taxonomy 210 based on a scoring of how well the concepts identified in the data files 140 match the concepts in the taxonomy 210. The process of categorizing the data files 140 into the taxonomy 210 can be divided into two separate processes. First, the taxonomy 210 can be generated by creating and linking categories 220 to form a tree of interrelated concepts. The concepts that are described by the categories 220 of the taxonomy 210 can be applied to the data files 140 in order to sort and/or extract the data files 140 of interest to a user. The formation and use of the categories 220 are described in greater detail in the discussion of FIGS. 3-6. Second, the taxonomy 210 and the data files 140 can be input into the concept analytics engine 120 that executes the functions that sorts the data files 140 according to the taxonomy 210. This functionality is described in greater detail in the discussion of FIG. 7.

The taxonomy 210 can be a hierarchical structure, similar in form to that of a computer directory structure, where each category 220 in the taxonomy 210 can correspond to a particular concept. The concept can be completely arbitrary, for example, sexual harassment, boats, income, sports, business transactions, research projects, promotions, etc. Each category 220 can have one or more sub-categories 220, which can be considered categories 220 of their own, but of more narrow scope than the parent category 220. In the example illustrated in FIG. 2, the top, or root, category 220 is "harassment based on sex." As sub-categories 220, there can be categories 220 such as "gender harassment," "sexual harassment," etc. A sub-category 220 of sexual harassment is shown to be a "hostile workplace." Additional sub-categories 220 are shown that are progressively more narrow categories 220 of their parent category 220. There can be any number of sub-categories 220 of a category 220, including zero, if the category 220 is a terminal category 220. The taxonomy 210, and the categories 220 that comprise it, can be memory repositories, for example, computer directories, folders, databases, node/pointer objects, containers, etc. In the GUI shown in FIG. 2, there can also be a sample preview window 230 that can display the sample text associated with a given sample. The sample text can be edited in the sample preview window 230 or be an immutable display.

The taxonomy tree can be represented by a binary tree. Each node in the taxonomy tree, starting with the root node, can have zero or more child nodes. Each node can be associated with a proprietary memory structure called a docmap. Docmaps can be run-length encoded collections of documents identifications. Each entry in the docmap references a document in the system's database. Docmaps can be optimized to use as little memory as possible while allowing for logical operators to be applied to two docmaps, yielding a third docmap. This allows for determining the union or intersection of two collections which is used to quickly determine document lists for entire branches of the taxonomy tree.

Figure 3:
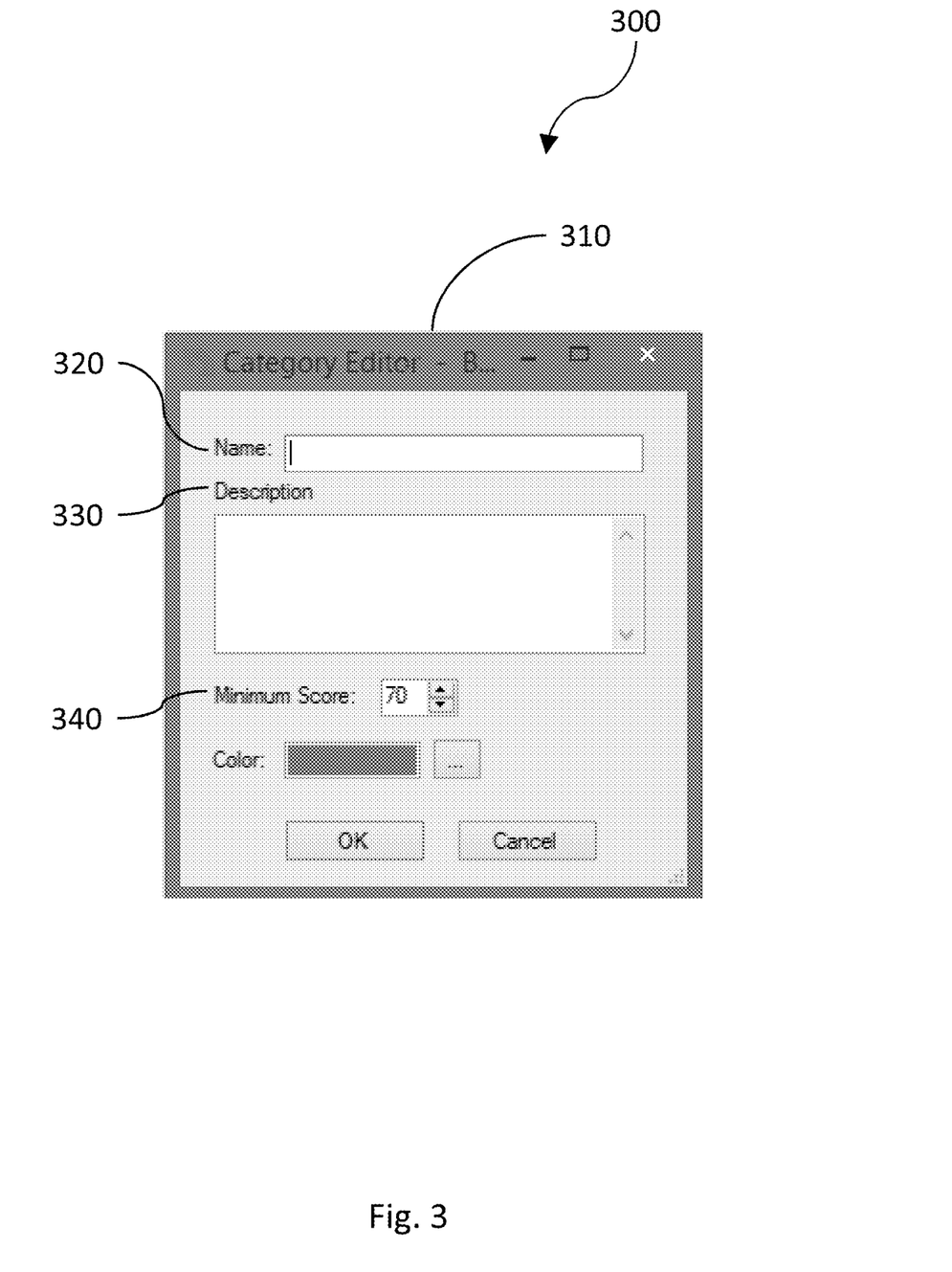
FIG. 3 is a screen capture illustrating the creation of a category.

FIG. 3 is a screen capture 300 illustrating the creation of a category 220. A category editor 310 can be a GUI used to create and/or edit the properties of the category 220. The category 220 can be thought of as a branch of the taxonomy 210 tree, with each category 220 corresponding to a concept of arbitrary scope. The category 220 can have a category name 320 and a category description 330. The category name 320 can be a simple identifier such as "workplace sexual harassment" or "turbine sales." The category description 330 can be a plain-language description of what the category 220 represents, for example "Sexual harassment or unwanted attention that occurs at the workplace site." or "The sales of turbines relating to the Bloomfield Station project." The category description 330 can be used only to provide reference for the user, and not used to define the concept to which the category 220 represents. Defining of the concept associated with the category 220 can be done by the inclusion of sample text, described in FIG. 4.

The category 220 can also contain a minimum score 340. The minimum score 340 can be a numerical rating that can be used after the data file 140 has been analyzed and scored by the concept analytics engine 120. The minimum score 340 can represent the degree with which the conceptual content of the scored data file 140 matches the concept described by the category 220. The numerical value of the minimum score 340 can be within any range, 0 to 1, 0 to 100, 1-10, etc. For example, if the minimum score 340 was set at the maximum, such as 100, then only an exact match would associate the data file 140 with the category 220. Conversely, if the minimum score 340 was set to zero, any data file 140 would be associated with the category 220. The minimum score 340 should be chosen such that data files 140 which are likely or very likely to have concepts in them that match the concept of the category 220 will be associated with that category 220. In practice, this means that values of, for example, 70, 80, 90, etc. can be used to obtain relevant, but not exact matches. Some difference between the concept identified in the data file 140 and the concept of the category 220 can be useful because while the contents of the data file 140 may not match the concept exactly, it may be very close, or close enough to be considered relevant or merit further consideration.

Keywords are not used to sort the data files 140, however keywords can be specified. Data files 140 will have keywords highlighted in the content of the data file 140. This can provide a user with a visual comparison of keyword searches as compared to concept analytics.

Figure 4:
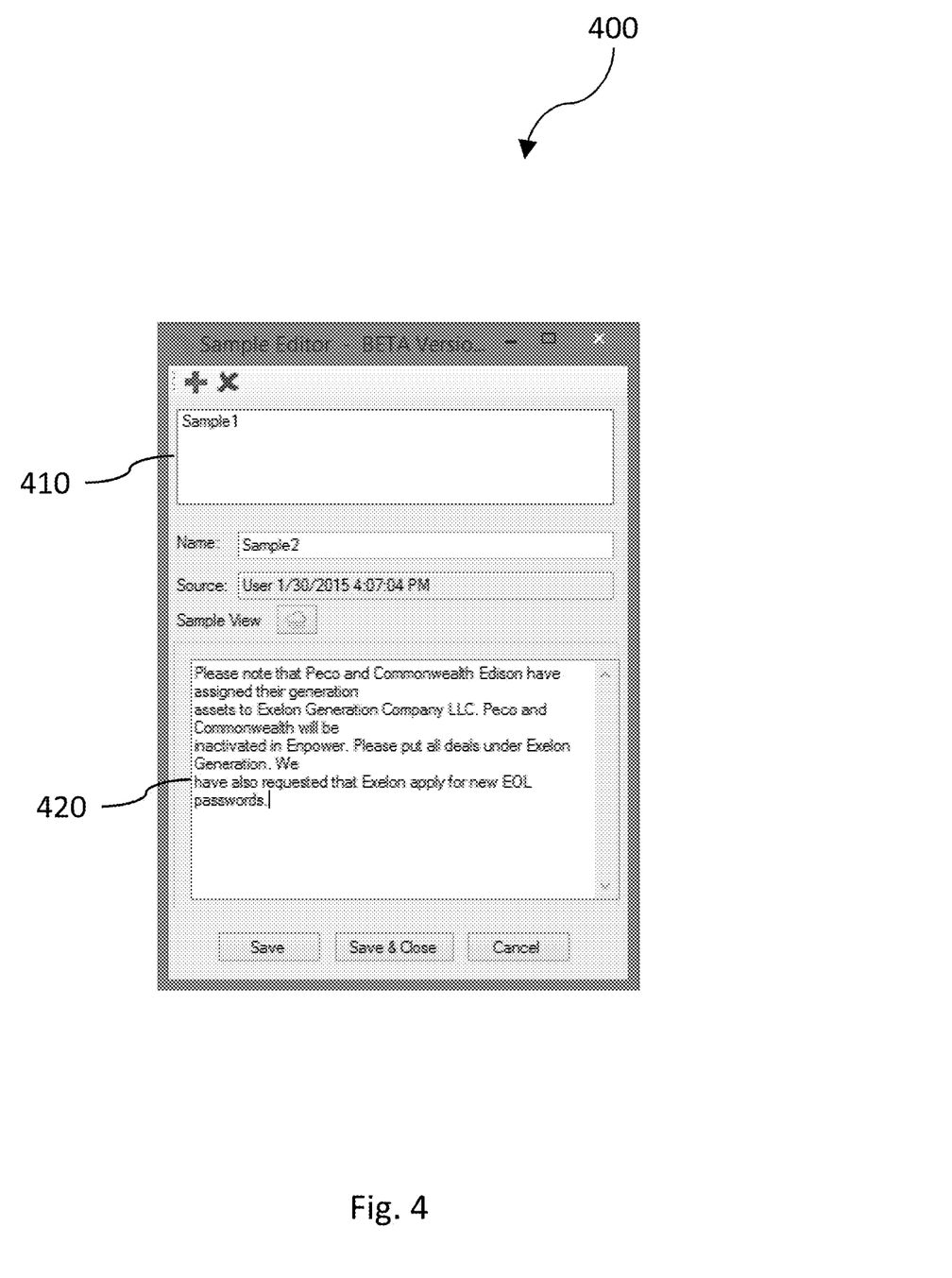
FIG. 4 is a screen capture illustrating the creation of a sample.

FIG. 4 is a screen capture 400 illustrating the creation of the sample 410. The sample 410 can be a collection of sample textual content 420 that can be used to define the concept associated with a given category 220. For example, in the example of FIG. 4, the sample 410 used to define the concept of "Asset Assignment" can include a collection of text that describes the activities associated with a particular asset assignment. The sample textual content 420 can be obtained from a sample 410 data file 140, which can include, or be independent of, the data files 140 to be analyzed. The clustering functionality, described by FIG. 6, can also be executed prior to creating the sample 410, in order to provide a user a starting point for the creation of the sample 410, the taxonomy 210, or the categories 220.

Referring now also to FIG. 2, it can be seen that the parent category 220 of a group of categories 220, for example the "hostile workplace" category 220, by definition can include the combined samples 410 of its child categories 220. The parent category 220 can also include additional sample textual content 420 used for its sample(s) 410 in addition to the implied sample textual content 420 of the child categories 220.

Figure 5:
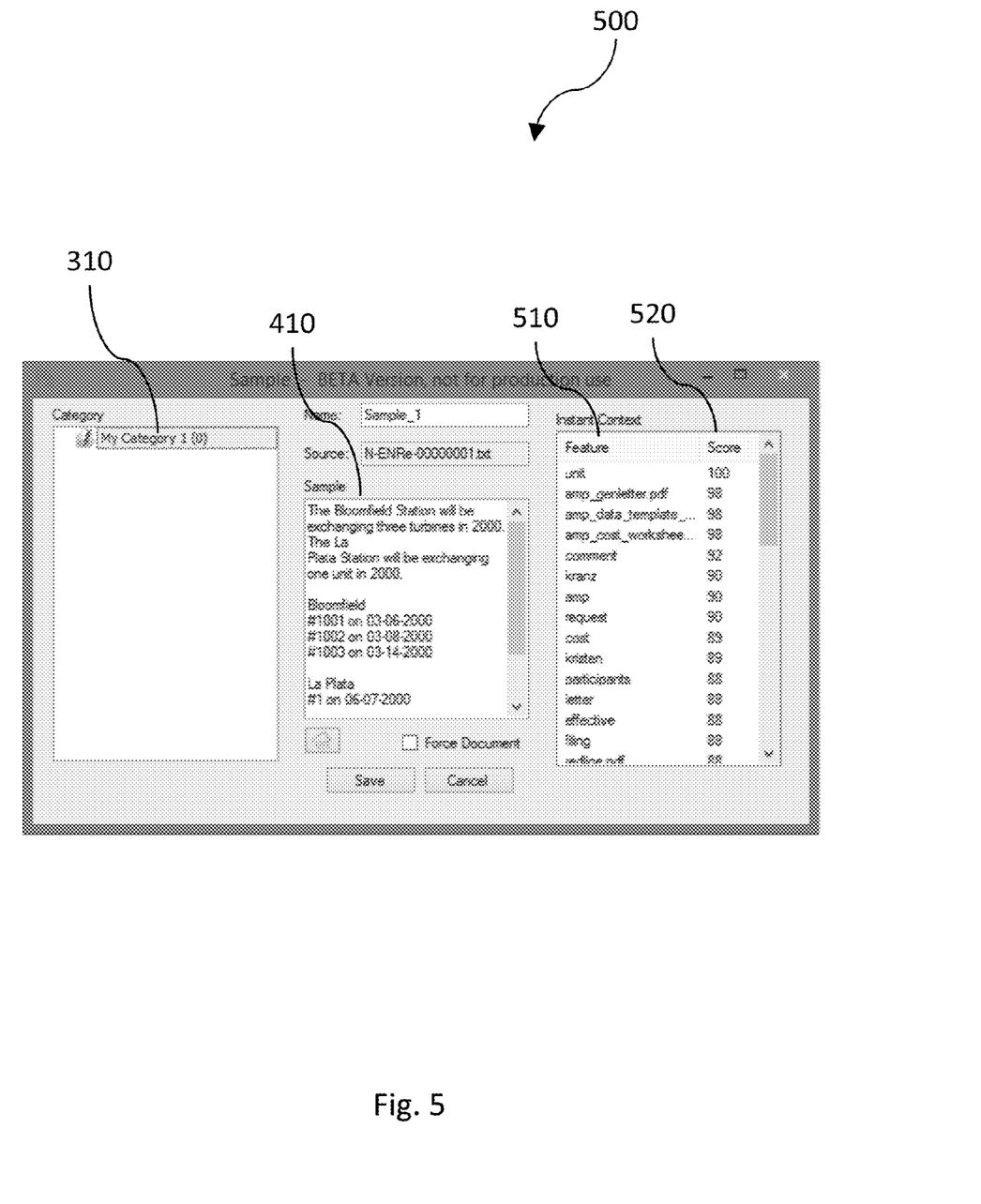
FIG. 5 is a screen capture illustrating features identified from the sample.

FIG. 5 is a screen capture 500 illustrating features identified from the sample 410. A user may wish to use the sample 410 to define the category 220, but not know what should be in included in the sample 410. In one implementation, when evaluating the sample 410, a visualization of text items 510 within the sample 410 can be generated that can show text items 510 along with a text item score 520. The text item score 520 can represent the relevance of the text item 510 to the concept that the sample 410 embodies. This can also be referred to as providing an "instant context" for the sample 410. For example, for a sample 410 describing the purchasing of turbine units, the text item "unit" receives a high score due to its close relationship with the concept of what the sample 410 describes. Similarly, the text item 510 "filing" can receive a lower score, which indicates that the concept for the sample 410 is less related to filing activities. This allows a user to easily determine what concepts are contained in a sample 410. Also, the visualization and the text items 510 can be updated as the sample 410 is modified. For example, if the sample 410 had content that was about offensive jokes, but also comment about purchase orders, the material about the purchase orders could be excluded from the sample 410 to provide a clearer illustration of the concept. The text items 510 relating to the purchase orders can then be removed from the visualization.

Figure 6:
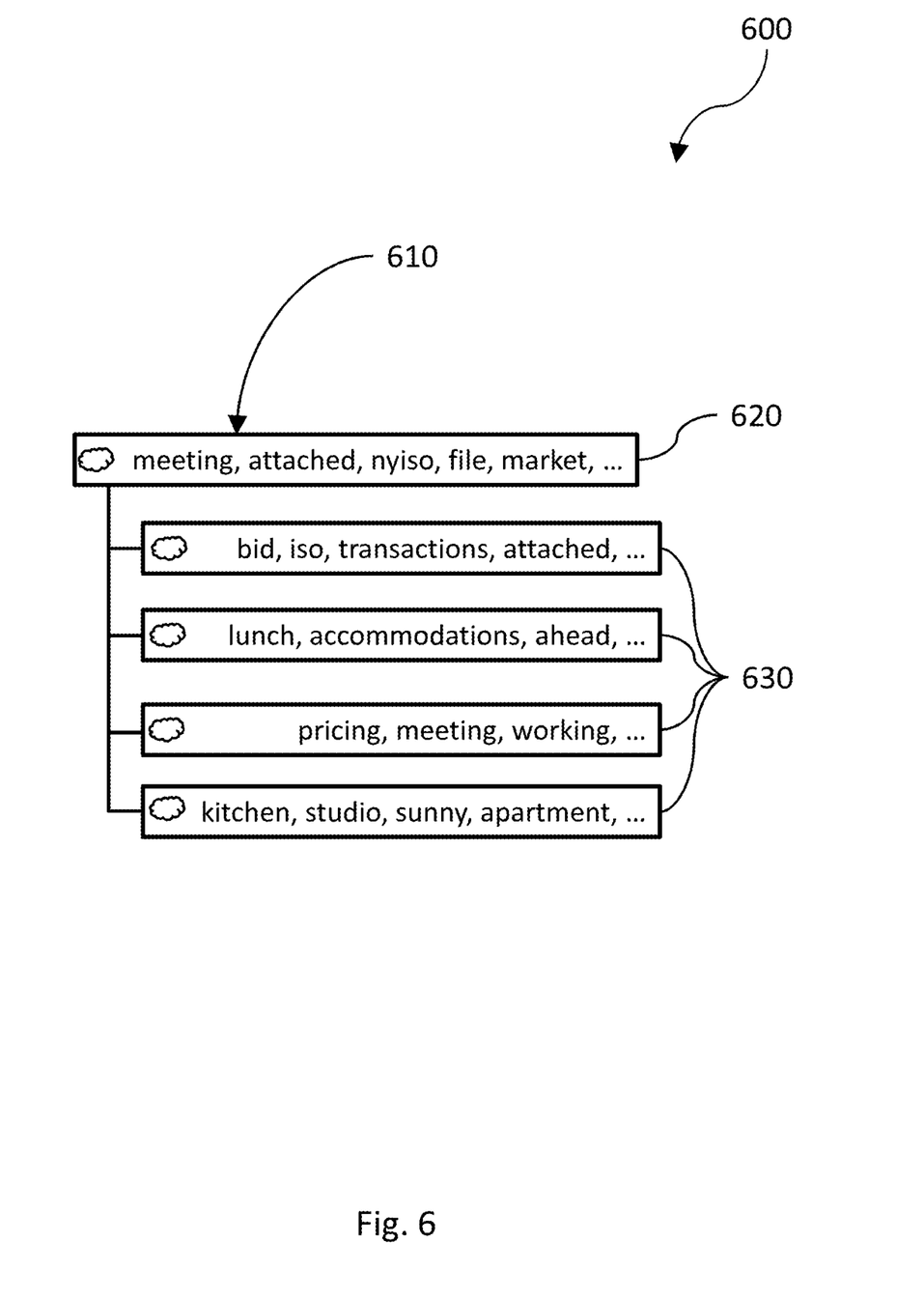
FIG. 6 is a diagram illustrating a cluster.

FIG. 6 is a diagram 600 illustrating a cluster 610. Clustering can be used as a way of organizing data files 140 to identify concepts within the data files 140, and without the user having knowledge of the data or even a clear idea of what data to seek. The concepts identified by clustering can be used as a starting point for creating the taxonomy 210. Clustering and ad-hoc keyword and concept searches can be performed without prior taxonomy creation.

The concept analytics engine 120 can organize the data into a tree of clusters 610, similarly to that of the taxonomy 210, but based only on the data itself without any input from the user. The cluster 610 can be made up of sets of parent clusters 620 and child clusters 630. Each member of the cluster 610 can include any of the content in the data files 140. The content that forms the cluster 610 can be, for example, words, phrases, file names, numbers, string and/or character sets, etc. Similar to the categories 220, each member of the cluster 610 can include a well-defined theme or concept where the concept analytics engine 120 has determined that the content is closely related. When considering the parent clusters 620, which can have additional child clusters 630 and by definition include them, the content in the parent cluster 610 can take on a broader character than that found in the child cluster 630. The cluster 610 can be formed from any specified collection of data files 140, for example, the cluster 610 can be formed from the entire collection of the data files 140, from data files 140 that have not been placed into a category 220 (i.e. using the clustering to identify possibly a new category 220), or from a subset of documents that match one of the keywords defined in the taxonomy 210.

Once the taxonomy 210 structure is defined and each of the categories 220 in the taxonomy 210 is populated with the samples 410, the taxonomy 210 can be applied to any group of data files 140, documents, etc. as described below.

Figure 7:
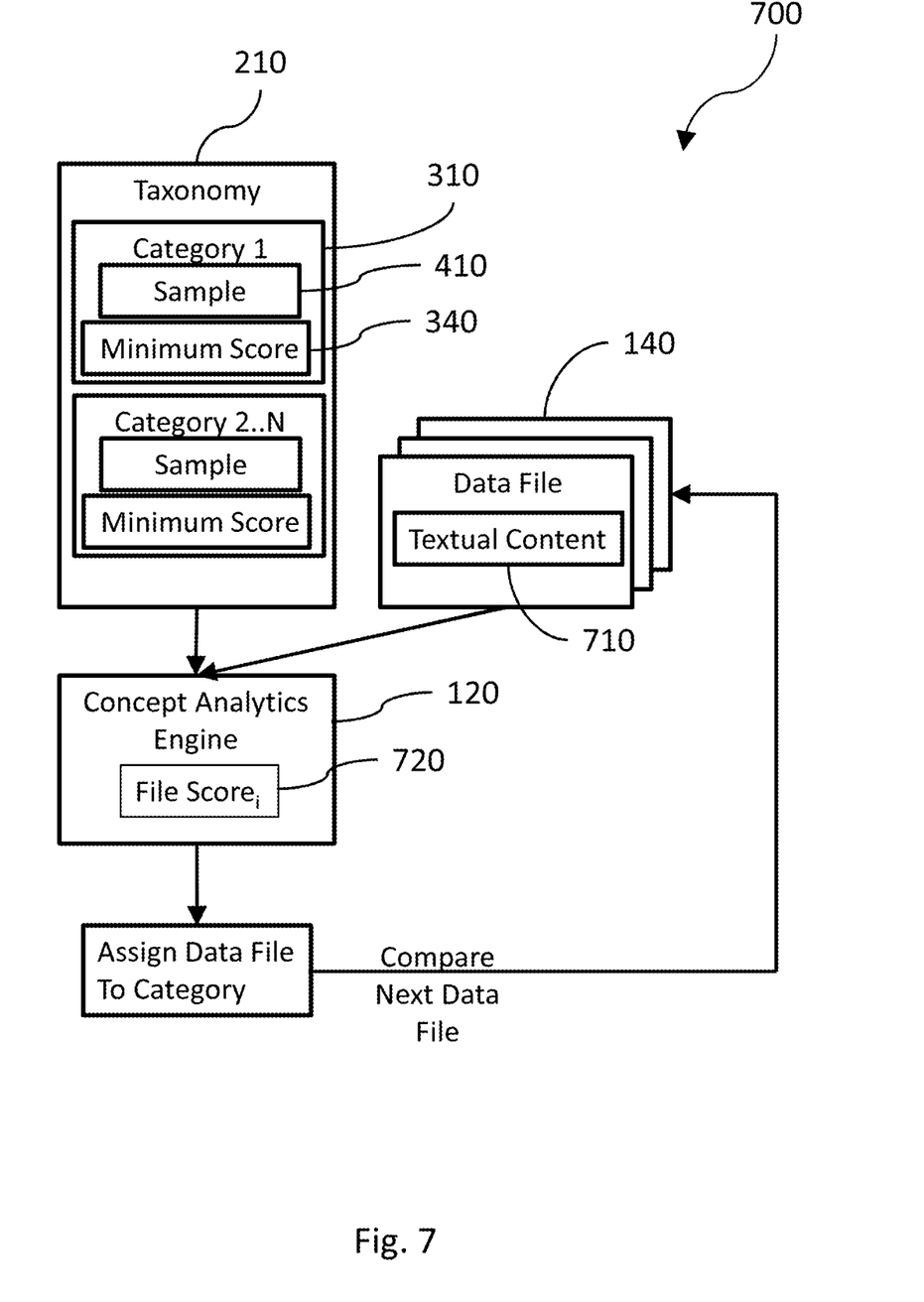
FIG. 7 is a block diagram illustrating the categorizing of data files by a concept analytics engine.

FIG. 7 is a block diagram 700 illustrating the categorizing of the data files 140 by the concept analytics engine 120. Before the taxonomy 210 is used to categorize the data files 140, the data files 140 must be ingested into the concept analytics engine 120. The concept analytics engine 120 can receive the data files 140 from any combination of the data sources 130, as described in FIG. 1. The concept analytics engine 120 then can extract textual content 710 from the data files 140 and can also save the textual content to a database. When the desired data files 140 have been ingested by the concept analytics engine 120, they can be categorized. Though the data files 140 must be ingested by the concept analytics engine 120 prior to the categorization, the taxonomy 210 can be constructed either before or after the ingestion of the data files 140. The data files 140 can include, or have added to their ingested form, a source identifier used to identify the source of the data. For example, if the text of an email was ingested by the concept analytics engine 120, the source identifier can reference the original email from which the text was extracted. This can be important later, when the data files 140 have been categorized, for providing the original data files 140 to a user. Before categorizing the data files 140, the taxonomy 210 can be ingested by the concept analytics engine 120. The taxonomy 210 can be a saved taxonomy 210 imported from the taxonomy database 180, or the taxonomy 210 can be a new taxonomy 210, created specifically for the desired project and then can be saved to the taxonomy database 180.

The process of categorization can begin with comparing the textual content 710 from the data file 140 against the sample 410 for each of the categories 220 in the taxonomy 210 to determine a file score 720. The file score 720 can represent the degree of similarity between the concepts identified in the data file 140 and the concepts identified in the category 220. It is important to note that a new file score 720 can be calculated each time the data file 140 is compared to a new category 220. This is denoted in FIG. 7 by the subscript "i," where the "i" refers to the i-th category 220 that the data file 140 has been compared with.

To calculate the file score 720, the concept analytics engine 120 utilizes Latent Semantic Indexing (LSI). LSI is an indexing and retrieval method that uses singular value decomposition to identify patterns in the relationships between the terms and concepts contained in an unstructured body of text. LSI is based on the principle that words that are used in the same contexts tend to have similar meanings. A key feature of LSI is its ability to extract the conceptual content of a body of text by establishing associations between those terms that occur in similar contexts. The method can uncover the underlying latent semantic structure in the usage of words in a body of text and how it can be used to extract the meaning of the text in response to user queries, commonly referred to as concept searches. Queries, or concept searches, against a set of documents that have undergone LSI will return results that are conceptually similar in meaning to the search criteria even if the results don't share a specific word or words with the search criteria.

To apply the technique of singular value decomposition to the ingested documents/data files 140, a term-document matrix A can be generated that identifies the occurrences of terms in the documents. The term-document matrix can be a large and sparse matrix of size m by n, where m corresponds to the number of unique terms and n corresponds to the number of documents. Singular value decomposition reduces the rank of the term-document matrix and identifies three matrices where $A \approx TSD^T$. T can represent the term vector space, and D can represent the document vector space. The singular value matrix S can represent a singular matrix containing the conceptual information from the document collection. The similarity between the documents in the vector spaces can be represented by the angle between the vector spaces T and D. For example, a perfect match would have a zero angle between the vector spaces, whereas no similarity would generate orthogonal vector spaces. Similar methods for scoring the ingested data files 140 against the taxonomy 210 can be used, for example latent semantic structure indexing, principal component analysis, correspondence analysis, probabilistic latent semantic analysis, etc.

Using the above techniques, each of the data files 140 can be compared to each of the categories 220, in turn, until the data files 140 have been compared to all the categories 220. Once the file score 720 for the data file 140 has been computed for each category 220, if the maximum file score 720 is greater than or equal to the minimum score 340 for the corresponding category 220, then the data file 140 can be associated with that category 220. If the maximum file score 720 is less than the minimum score 340 for all categories 220, then the data file 140 can remain unassociated or can be associated with an "uncategorized" category 220. Documents associated with the uncategorized category are those which were not found to be represented by the taxonomy 210.

In one implementation, the association can be single-valued, requiring that the data file 140 be associated with only one category 220. This can be done to avoid multiple references to the data file 140 from occurring in the taxonomy 210. In the event of the file score 720 exceeding the requirements of more than one category 220, the file score 720 can be placed in only the category 220 with which it received the highest file score 720, i.e. the best match.

For each of the data files 140 compared, after the data file 140 has been associated with the appropriate category 220, a representation of the data file 140 can be transmitted to another computing system, displayed, sent to the export database 160, or otherwise distributed. The data file 140 and the file score 720 associated with the data file 140 can be transmitted together to provide an indication of the confidence of the categorization of the data file 140 with the category 220. The data files 140 transmitted can be from a single category 220, from multiple categories 220, or for the entire taxonomy 210. Furthermore, an association identifier can be transmitted that shows which categories 220 are associated with the data files 140.

Figure 8:
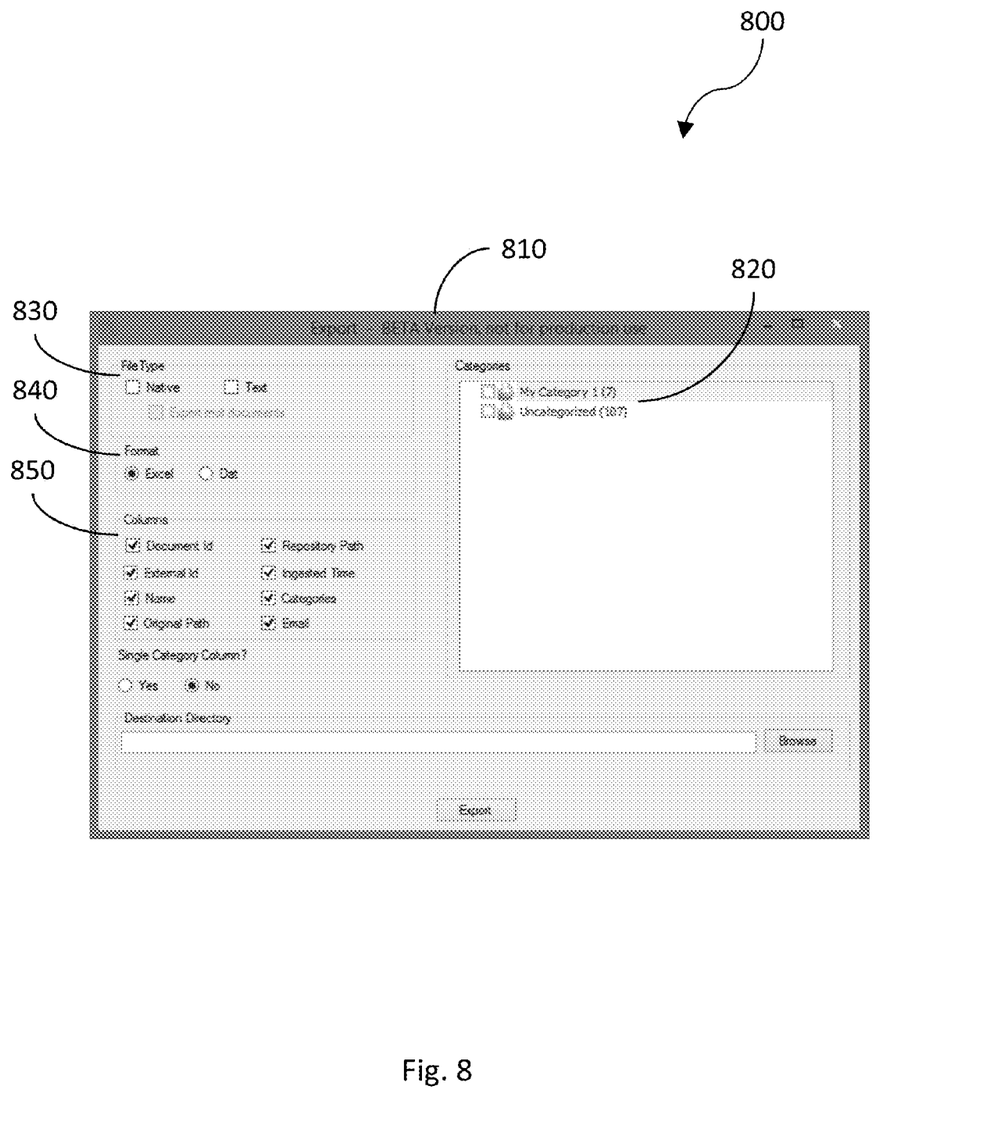
FIG. 8 is a screen capture illustrating an exporting graphical user interface used to export the categorized data files.

FIG. 8 is a screen capture 800 illustrating an exporting graphical user interface 810 used to export the categorized data files 140. An export GUI 810 can be used to select data files 140 to be exported along with information about what category 220 the data files 140 were categorized into. The export GUI 810 can contain a category field 820 that allows the user to select which categories 220 to include for export. There can be a file type field 830 where the user can select the output file type. The two examples of the output file type shown are native and text. A representation of the data file 140 can be produced that is a forensically accurate reproduction of the original file. Additionally, the data file 140 can be transmitted in its native format, with no manipulation, reformatting, alteration, etc. of the data file 140. The transmission can also include all of the original metadata, attachments, or other electronic associations for the original data file 140. The text file type 840 can specify the export to be an unformatted text file. The exported data files 140 can also be in formats such as EXCEL or delimited files. Other formats can also be used, such as formatted text files, compressed files, etc. A column item selector 850 can be used to customize the contents of the exported data files 140. There can be columns such as "document id," "external id," "name," "original path," "repository path," "Book marks", "ingested time," "categories," "email," etc.

Figure 9:
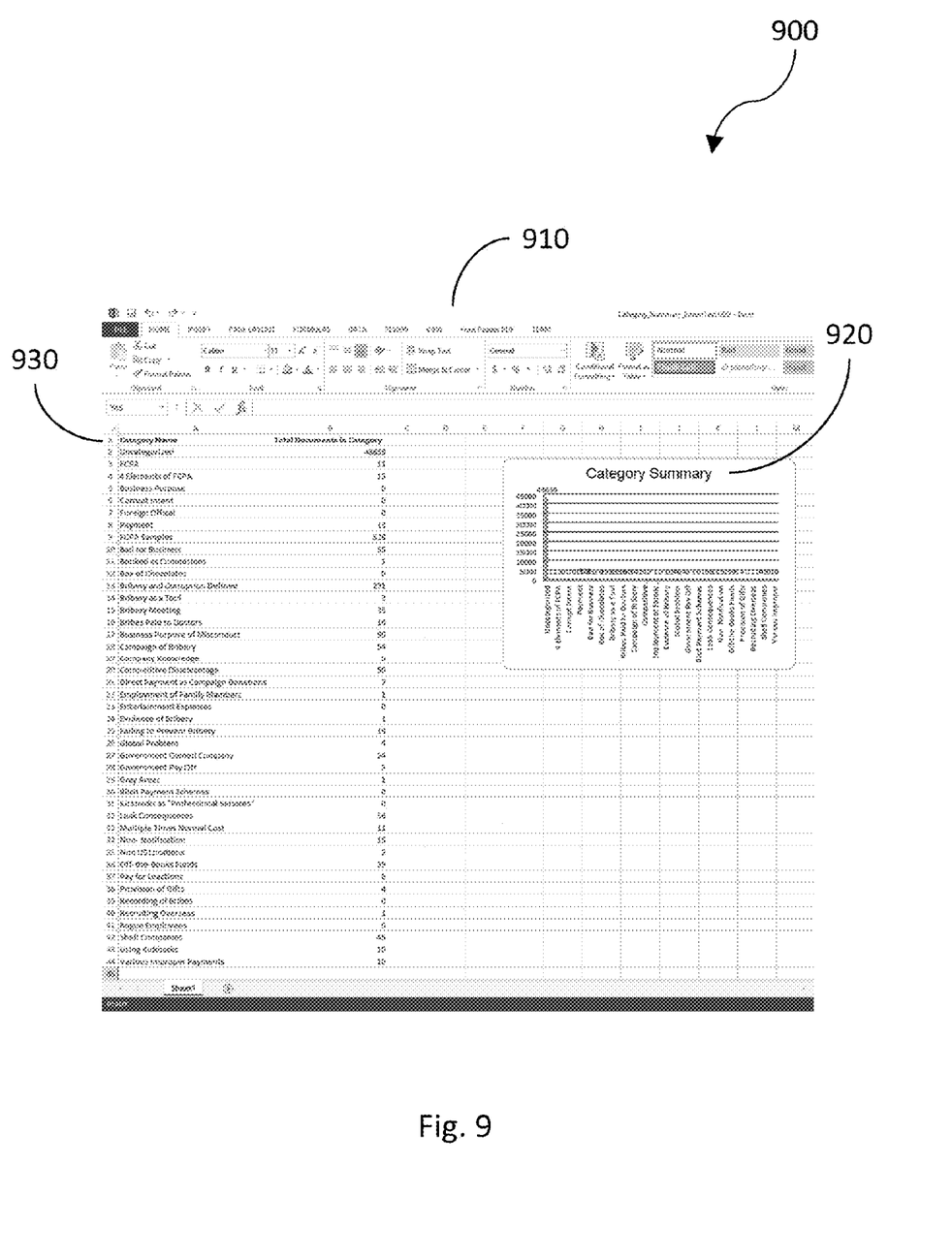
FIG. 9 is a screen capture illustrating a report generated after categorizing the data files.

FIG. 9 is a screen capture 900 illustrating a report 910 generated after categorizing the data files 140. After the data files 140 have been categorized according to the taxonomy 210, reports 910 can be generated that detail the results of the categorization. One example of the report 910 is shown in FIG. 9 as a spreadsheet that displays the number of data files 140 categorized in each of the categories 220 in the taxonomy 210. A histogram 920 can also be created to plot the data to visually see the distribution of the data files 140 across a category list 930. As shown in the figure, the vast majority of the data files 140 have been placed into the "uncategorized" category 220, meaning that they did not fall into the definition of the taxonomy 210. This is expected, as it is likely that only a small percentage of documents in a document collection relate to a particular concept. To have a more meaningful histogram 920, the "uncategorized" category 220 can be excluded from the category list 930 to more easily identify the predominant concepts. Other types of reports can be pie-charts describing the distribution of documents in the categories, communication matrices describing which users are in communication with each other, file type reports describing the distribution of file types ingested, statistics on counts (e.g. matches) per category in a sample, cluster summaries that describe document counts per each item in the cluster, top communications (best matches) by category, communications during a given timespan, keyword summaries that can show how many documents have the specified keyword, etc.

Figure 10:
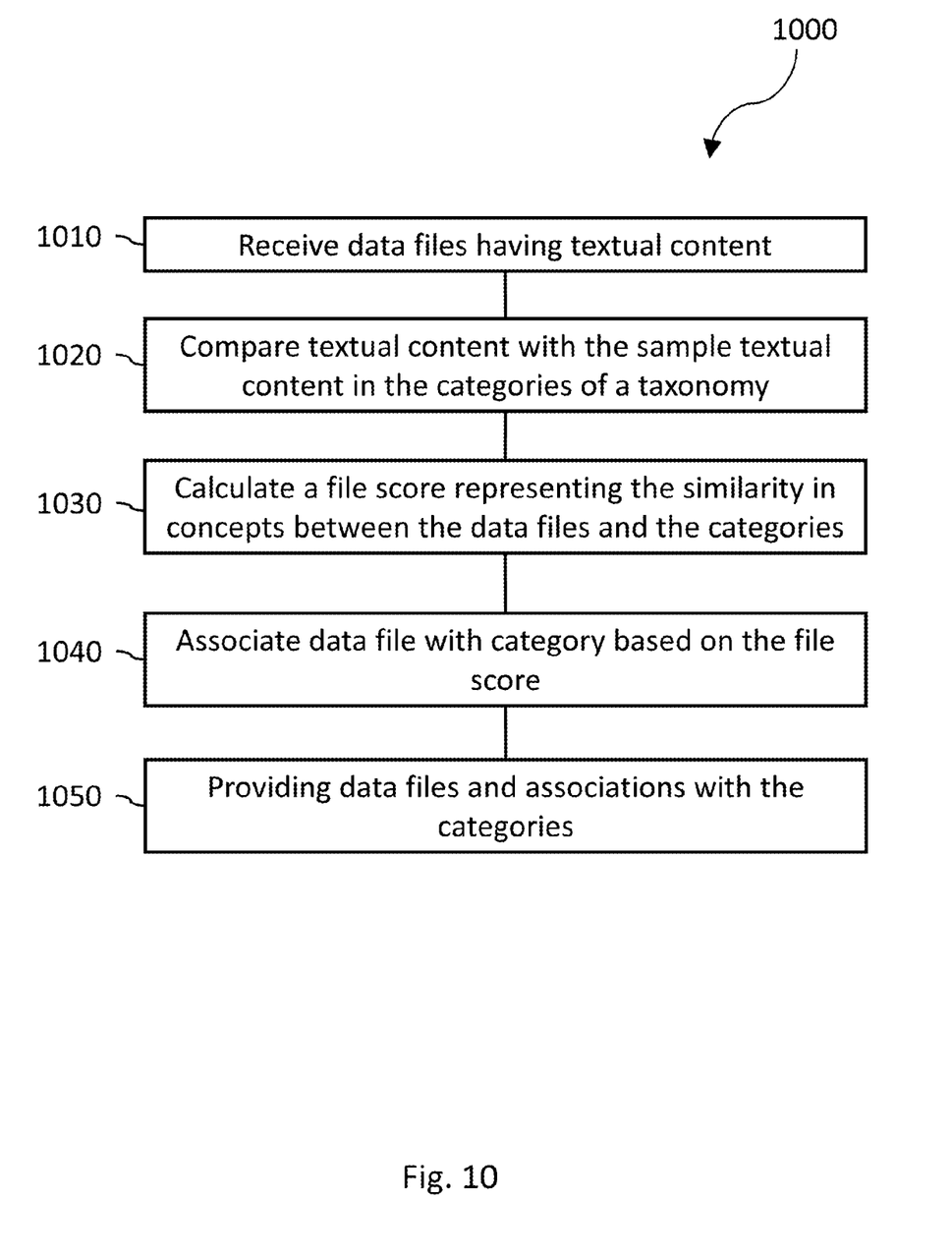
FIG. 10 is a process flow diagram illustrating the analysis and characterization of the data files according to the taxonomy.

FIG. 10 is a process flow diagram 1000 illustrating the analysis and characterization of the data files 140 according to the taxonomy 210.

At 1010, the data file 140 can be received from the data source 130. The data file 140 can include textual content 710 representative of the contents of the data file 140.

At 1020, the concept analytics engine 120 can, for each data file 140 and each category 220, compare the textual content 710 with the sample textual content 420 for the category 220.

At 1030, the file score 720 can be calculated for each data file 140—category 220 pair, indicating the degree of similarity between the concepts represented by the sample textual content 420 of the category 220 and the textual content 710 of the data file 140.

At 1040, the data file 140 can be associated with the category 220 based on the file score 720 being equal to or greater than the minimum score 340.

At 1050, the data file 140 and the file score 720 can be provided to another computing system.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
  receiving, by at least one data processor, a plurality of data files from a plurality of data sources that comprise textual content;
  categorizing, by the at least one data processor, the plurality of data files into a taxonomy of categories in which each category has associated sample textual content defining a concept for the category and each category associated with a memory-optimized structure that comprises a collection of at least one identification corresponding to at least one of the plurality of data files, the categorizing comprising, for each category:
    comparing, by the at least one data processor, for each of the plurality of data files, the textual content of the data file with the sample textual content for the category;
    calculating, by the at least one data processor, based on the comparing and for each of the plurality of data files, a file score corresponding to the degree of similarity between the defined concept of the category and a determined concept for the data file; and
    generating, by the at least one data processor, the identification stored in the memory-optimized structure that comprises the collection by at least associating, for each of the plurality of data files, the data file with the category if the file score is equal to or greater than a pre-determined minimum score for the category; and
  providing, by the at least one data processor, at least a portion of the data file and/or the associated file score.

2. The method of claim 1, further comprising:
  generating, by the at least one data processor, the taxonomy by:
    adding, by the at least one data processor and to the taxonomy, at least one of the categories, with each of the at least one categories representing the first concept;
    adding, by the at least one data processor and to the at least one category, a sample comprising the sample textual content corresponding to the first concept; and
    adding, by the at least one data processor and to the at least one category, the minimum score.

3. The method of claim 1, wherein the associating is between the data file and only one category, the category being the category generating the highest file score equal to or greater than the minimum score.

4. The method of claim 1, further comprising clustering, by the at least one data processor, the textual content into at least one cluster, the cluster representative of identified concepts.

5. The method of claim 1, wherein the data file further comprises a source identifier identifying the data source.

6. The method of claim 1, wherein at least one text item is identified from the sample textual content and the text item is given a text item score to identify the relevance of the text item to the sample.

7. The method of claim 1, wherein the providing includes providing, by the at least one data processor, a first representation of the data file along with a second representation of all attachments, metadata, or electronic associations.

8. The method of claim 1, wherein providing at least a portion of the data file and/or the associated file score comprises at least one of: displaying, by the at least one data processor, at least a portion of the data file and/or the associated file score, loading, by the at least one data processor, at least a portion of the data file and/or the associated file score into memory, transmitting, by the at least one data processor, data including at least a portion of the data file and/or the associated file score to a remote computing device, or storing, by the at least one data processor, at least a portion of the data file and/or the associated file score into persistent memory.

9. The method of claim 1, wherein the memory-optimized structure that comprises the collection is generated by run-length encoding the collection.

10. The method of claim 1, wherein the receiving is from an ongoing data stream providing an ongoing source of the data files to be categorized.

11. The method of claim 10, wherein the ongoing data stream is from an e-mail server.

12. A non-transitory computer program product storing instructions that, when executed by at least one programmable processor, cause the at least one programmable processor to perform operations comprising:
receiving a plurality of data files from a plurality of data sources that comprise textual content;
categorizing the plurality of data files into a taxonomy of categories in which each category has associated sample textual content defining a concept for the category and each category associated with a memory-optimized structure that comprises a collection of at least one identification corresponding to at least one of the plurality of data files, the categorizing comprising, for each category:
comparing, for each of the plurality of data files, the textual content of the data file with the sample textual content for the category;
calculating, based on the comparing and for each of the plurality of data files, a file score corresponding to the degree of similarity between the defined concept of the category and a determined concept for the data file; and
generating the identification stored in the memory-optimized structure that comprises the collection by at least associating, for each of the plurality of data files, the data file with the category if the file score is equal to or greater than a pre-determined minimum score for the category; and
providing at least a portion of the data file and/or the associated file score.

13. The non-transitory computer program product of claim 12, wherein the operations of generating the taxonomy further comprise:
adding, to the taxonomy, at least one of the categories, with each of the at least one categories representing the first concept;
adding, to the at least one category, a sample comprising the sample textual content corresponding to the first concept; and
adding, to the at least one category, the minimum score.

14. The non-transitory computer program product of claim 12, wherein the operations further comprise clustering the textual content into at least one cluster, the cluster representative of identified concepts.

15. The non-transitory computer program product of claim 12, wherein at least one text item is identified from the sample textual content and the text item is given a text item score to identify the relevance of the text item to the sample.

16. The non-transitory computer program product of claim 12, wherein the operations of providing includes providing a first representation of the data file along with a second representation of all attachments, metadata, or electronic associations.

17. A system comprising:
at least one programmable data processor device; and
memory storing instructions which, when executed by the at least one programmable data processor, result in operations comprising:
receiving a plurality of data files from a plurality of data sources that comprise textual content;
categorizing the plurality of data files into a taxonomy of categories in which each category has associated sample textual content defining a concept for the category and each category associated with a memory-optimized structure that comprises a collection of at least one identification corresponding to at least one of the plurality of data files, the categorizing comprising, for each category:
comparing, for each of the plurality of data files, the textual content of the data file with the sample textual content for the category;
calculating, based on the comparing and for each of the plurality of data files, a file score corresponding to the degree of similarity between the defined concept of the category and a determined concept for the data file; and
generating the identification stored in the memory-optimized structure that comprises the collection by at least associating, for each of the plurality of data files, the data file with the category if the file score is equal to or greater than a pre-determined minimum score for the category; and
providing at least a portion of the data file and/or the associated file score.

18. The system of claim 17, wherein the operations of generating the taxonomy further comprise:
generating the taxonomy by:
adding, to the taxonomy, at least one of the categories, with each of the at least one categories representing the first concept;
adding, to the at least one category, a sample comprising the sample textual content corresponding to the first concept; and
adding, to the at least one category, the minimum score.

19. The system of claim 17, wherein the operations further comprise clustering the textual content into at least one cluster, the cluster representative of identified concepts.

20. The system of claim 17, wherein the operations of providing further comprise providing a first representation of the data file along with a second representation of all attachments, metadata, or electronic associations.

* * * * *